United States Patent [19]

Myers

[11] Patent Number: 4,603,760
[45] Date of Patent: Aug. 5, 1986

[54] SLOTTED INSULATOR AND DISC BRAKE ASSEMBLY USING SAME

[75] Inventor: William K. Myers, Centerville, Ohio

[73] Assignee: General Motors Corporation, Detroit, Mich.

[21] Appl. No.: 772,029

[22] Filed: Sep. 3, 1985

[51] Int. Cl.[4] .................... F16D 65/38; F16D 65/78
[52] U.S. Cl. .................... 188/73.37; 188/250 R; 188/264 G
[58] Field of Search .............. 188/264 G, 73.1–73.2, 188/250 G, 250 B, 250 R, 71.6, 250 E, 218 A, 73.37, 73.38, 73.36, 73.35, 370; 192/107 R, 113, 85 AA

[56] References Cited

U.S. PATENT DOCUMENTS

| | | | |
|---|---|---|---|
| 3,722,634 | 3/1973 | Ogasawara et al. | 188/264 G X |
| 3,885,651 | 5/1975 | Odier | 188/73.37 |
| 4,022,302 | 5/1977 | Janssen | 188/73.37 X |
| 4,064,975 | 12/1977 | Filderman | 188/73.37 |
| 4,103,761 | 8/1978 | Filderman | 188/73.37 |
| 4,225,021 | 9/1980 | Kawamura et al. | 188/73.37 |
| 4,513,844 | 4/1985 | Hoffman, Jr. | 188/264 G X |

*Primary Examiner*—Douglas C. Butler
*Attorney, Agent, or Firm*—D. D. McGraw

[57] ABSTRACT

A brake shoe has a noise insulator sheet secured to the shoe back and engaged by the piston annular end or a caliper leg. This generates one or more high pressure areas which may cause the insulation layer to buckle and separate from the shoe. By providing slots or lances through the insulation layer immediately adjacent the high pressure areas, a discontinuity is provided which prevents such buckling and separation.

14 Claims, 5 Drawing Figures

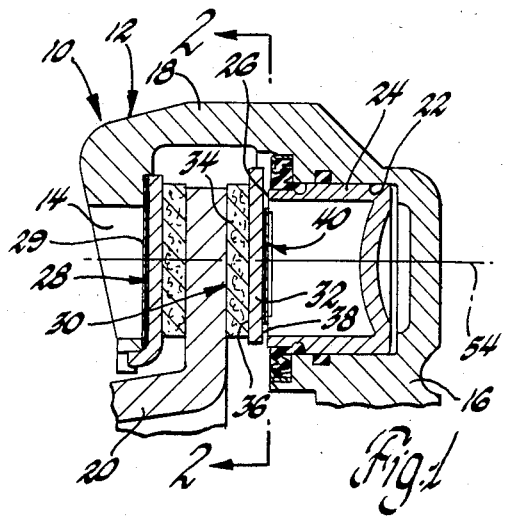
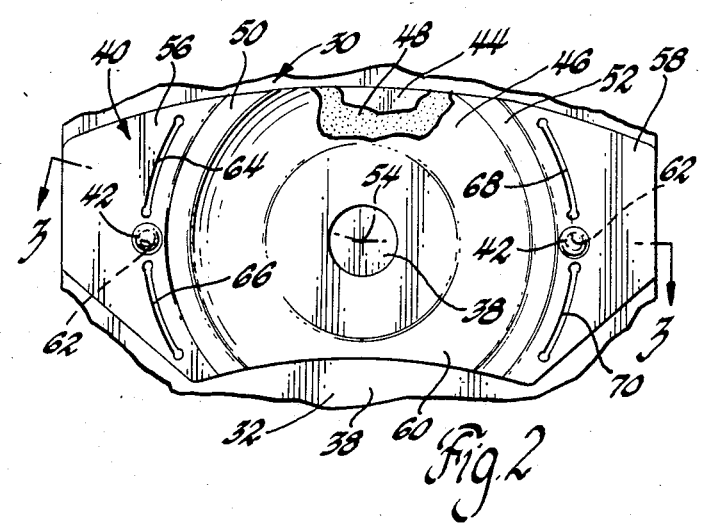
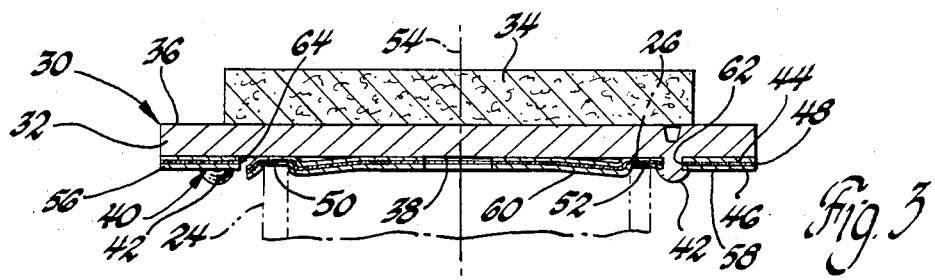
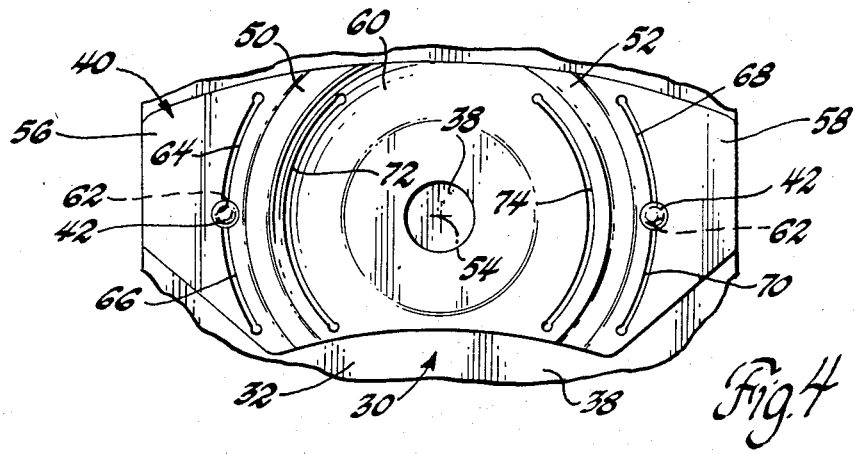
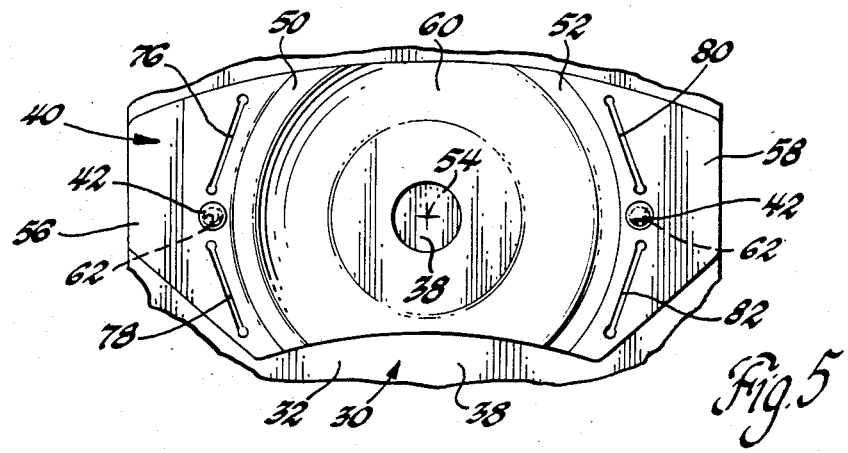

SLOTTED INSULATOR AND DISC BRAKE ASSEMBLY USING SAME

The invention relates to a disc brake shoe insulator providing a discontinuity in deformation of the insulator caused by high pressure loading by the piston or the caliper housing, permitting the unloaded portions of the insulator to remain secure to the backing plate, and a disc brake assembly using such an insulator. It more particularly relates to an insulator secured to one side of an inboard disc brake shoe and arranged to have the annular end of a disc brake piston, or portions of the caliper housing in the case of an outboard shoe, engaging the insulator to act on the brake shoe for brake actuation. While the invention is applicable to outboard shoes engaged by the outboard leg of a sliding caliper housing, further detailed description will be provided with the inboard shoe and piston construction. It is to be understood, however, that the invention relates to all shoes and insulators subjected to high pressure loading. Therefore, as used in certain claims, the disc brake actuating members may be either an actuating piston or a caliper leg, as shown in the drawing.

The high pressure loading of the annular surface of the piston which engages the shoe through the insulator is prevented from deforming the insulator by the provision of one or more slots formed through the insulator immediately adjacent but laterally outward from the high pressure load area of the insulator. Such slot or slots provide a discontinuity in the deformation of the insulator which may result from the high pressure load exerted on the insulator by the piston during brake actuations. This discontinuity permits the unloaded areas of the insulator to remain firmly secured to the backing plate and therefore to fully act in their insulative capacities.

It is well known to use heat and/or noise insulators between a disc brake piston and the backing plate of a disc brake shoe assembly. Insulators which are formed of layers of steel and adhesive have been found to be particularly effective for noise insulation purposes. Such insulators are formed as sheets which are cut to the same shape as that of the backing plate and are suitably secured to the backing plate by rivets or adhesive, or both. If for any reason an area of the insulator becomes detached from the backing plate, the insulative effect is lessened. One of the causes of such detachment has been found to be deformation of the insulator at the high pressure load area where the piston engages the insulator and transmits relatively high forces therethrough during brake actuation. By providing one or more discontinuity slots through the insulator immediately adjacent the high pressure area, the buckling and detachment effects of any such deformation can be substantially eliminated so that the unloaded portions of the insulator may remain secured to the backing plate even though the high pressure area portions of the insulator are deformed.

The slots providing such discontinuity may conform to the shape of the high pressure area and be positioned immediately adjacent thereto, or may have other shapes which substantially conform. For example, the disc brake piston is commonly circular with an annular end engaging the insulator. Therefore the discontinuity slots would also be arcuate. In some constructions the slots may be formed as one or more straight lines which are positioned in a tangent-like fashion but spaced slightly radially from the high pressure area. When the insulator is secured to the backing plate by means of rivets, the discontinuity slots may either terminate either before they intersect the insulator openings through which the rivets pass or in other instances may intersect such openings so that the slots and the rivet openings are formed in the insulator as a common opening. The slots may be formed as cuts or lances, or may be formed with a slight amount of material being removed. It is desirable to form the slots with enlarged ends, particularly if the slots made by cuts or lances, so as to relieve the stress at the ends of the slots and therefore prevent the slots from opening further than desired. The slots may be positioned radially outwardly of the high pressure area, and slots may also be provided radially inwardly thereof to protect the portion of the insulator which is positioned radially inward of the high pressure area.

IN THE DRAWING:

FIG. 1 is a cross-section view, with parts broken away, of a disc brake assembly having brake shoe assemblies with insulators embodying the invention.

FIG. 2 is a view taken in the direction of arrows 2—2 of FIG. 1 and showing an inboard portion of the disc brake assembly with the insulator embodying the invention in elevation, and with parts broken away.

FIG. 3 is a cross-section view taken in the direction of arrows 3—3 of FIG. 2 showing the brake shoe assembly having the embodiment of the invention illustrated in FIG. 2.

FIG. 4 is a view similar to FIG. 2 showing another embodiment of the invention.

FIG. 5 is another view similar to FIG. 2 and showing yet another embodiment of the invention.

The disc brake assembly 10 includes a caliper 12 having legs 14 and 16 joined by a bridge section 18. The caliper extends over the disc 20 to be braked. Caliper leg 16 has a cylinder 22 formed therein in which disc brake piston 24 is reciprocably received. Piston 24 is illustrated as being the usual cup-shaped piston having an annular end 26 opening toward disc 20. The outboard brake shoe assembly 28 is suitably secured to caliper leg 14 so as to be frictionally engageable with one side of disc 20. Assembly 28 includes an insulator 29 secured to the backing plate and engaged under high pressure loading by portions of caliper leg 14 when the brake assembly is actuated. The inboard brake shoe assembly 30 is positioned between the piston annular end 26 and the other side of disc 20 so as to be moveable by the piston into friction engagement with disc 20 when the brake is actuated. Further description of the invention relates to the inboard brake shoe assembly 30, but the inventive concept is applicable to the outboard shoe assembly 28 as well.

The inboard brake shoe assembly 30 includes a backing plate 32 with a friction pad 34 being secured to one backing plate side 36. The other side 38 of the backing plate has a sheet-like insulator 40 secured thereto. Insulator 40 may be secured by adhesive, or by the use of rivets such as integral rivets 42, or both. Insulator 40 may be a noise insulator or a heat insulator, or both. It preferably covers substantially the entire side 38 of the backing plate 32. In the form of a noise insulator, the insulator 40 is preferably constructed of multiple layers, the layers 44 and 46 being made of sheets of steel joined together by an adhesive layer 48, preferably of a viscoelastic material. Details of the construction of inboard shoe assembly 30 are better illustrated in FIG. 3.

The piston annular end 26 normally engages the brake shoe assembly 30 at two arcuate high pressure areas of piston engagement 50 and 52 which are radially opposite each other relative to the piston axis 54. The high pressure areas 50 and 52 are shown in FIGS. 2 through 5. As can be seen, the total area of the two high pressure areas 50 and 52, which is the portion of the shoe assembly 30 actually engaged by the piston annular end 26, is relatively small in relation to the total area of the insulator 40. The inboard brake shoe assembly 30, and therefore the insulator 40, is divided by the high pressure areas 50 and 52 so that there are radially outward portions 56 and 58 of the total area of the insulator 40 which are respectively radially outward, and therefore laterally outward, of the high pressure areas 50 and 52. The insulator 40 also has a radially inner portion 60 which is positioned radially inward of the arcuate high pressure areas 50 and 52. Thus the high pressure areas 50 and 52 are clearly limited in surface area relative to the other area portions 56, 58 and 60 of the insulator. When the insulator 40 is secured to the backing plate 32 by means of rivets 42, the insulator is provided with openings 62 through which the rivets 42 extend. These openings are positioned radially outward of the high pressure arcuate areas 50 and 52 so that the rivet heads are also positioned outward of the area of contact of the piston annular end 26 with the insulator 40.

It has been found that over a period of time, many brake actuations, and particularly the heavy brake actuations, may cause some deformation of the insulator 40 in the immediate vicinity of the high pressure areas of piston engagement 50 and 52. Such deformation is illustrated in FIG. 3, with the section of the insulator radially inner portion 60 immediately adjacent high pressure areas 50 and 52 being illustrated as deformed, the illustration showing the deformation in an exaggerated style for clarity and emphasis. It has been found particularly desirable to keep insulator 40 secured to the side 38 of the backing plate in surface engagement at all times in order for the insulator to perform with maximum efficiency. In order to do this, it is therefore necessary to prevent the deformation of adjacent areas, and particularly any buckling and consequent separation of the insulator from the backing plate caused by such deformation. Therefore, in accordance with the invention, cuts or slots are formed through the insulator immediately adjacent the high pressure areas 50 and 52, the cuts or slots providing deformation discontinuity in the insulator and therefore permitting the portions of the insulator beyond the cuts or slots to remain secured to the backing plate because those portions are not subjected to buckling or other deformation caused by piston high pressure loading.

As more particularly shown in FIGS. 2 and 3, the slots 64 and 66 are provided laterally outward from the high pressure area 50 but immediately adjacent that area, and are also positioned on either side of an opening 62 in the insulator through which one of the rivets 42 extends. Similar slots 68 and 70 are provided laterally outward of the high pressure area 52. The slots are formed in the laterally outward portions 56 and 58 of the insulator 40. Slots 64, 66, 68, and 70 are illustrated with closed ends so that they are spaced from the openings 62 receiving rivets 42, and are also spaced inwardly from the outer edges of the insulator 40. The slots are preferably provided with stress-relieved ends, illustrated as being slightly enlarged slot portions having a circular conformation. This is particularly important if the slots are formed as lances or cuts through the insulator rather than formed by removal of some material. The arcuate slots of FIGS. 2 and 3 are illustrated as being concentrically outward of the high pressure areas 50 and 52, with the slot arc also being based on axis 54.

As can be seen in FIG. 3, the high pressure areas 50 and 52 may cause the deformation or buckling of the immediate adjacent portions of the insulator, with separation of the insulator from engagement with the side 38 of the backing plate. By providing the slots as deformation discontinuity, the outer portions 56 and 58 of the insulator 40 are not adversely affected by the deformation or buckling, and remain tightly secured to the surface 38 of the backing plate 32.

FIG. 4 shows a slot arrangement in which slots 72 and 74 are also provided in the radially inner portion 60 of the insulator, radially inward of the high pressure areas 50 and 52. These slots, constructed similarly to the outer slots, therefore provide deformation discontinuity for the radially inner portion 60 and minimize buckling and separation of the insulator from the backing plate in the area covered by the inner portion 60. It is to be understood that the slots 72 and 74 may be provided in any of the modifications illustrated.

FIG. 4 also shows a modification of the slots 64, 66, 68 and 70 whereby the slot inner ends extend into the openings 62.

The arrangement shown in FIG. 5 has slots 76, 78, 80 and 82 formed in the insulator which are similar to slots 64, 66, 68, and 70. However, the slots of FIG. 5 are illustrated as being straight line slots which are positioned radially outward of the high pressure areas 50 and 52 but in a tangent-like spaced arrangement to the arc of the outer side of those areas.

In all instances, it is preferable that the cuts or slots extend entirely through the insulator 40 from one side thereof engaged by the piston annular end to the other side thereof secured to the brake shoe side 38. In some instances only a single slot may be provided in place of two slots per side as illustrated in FIGS. 2 and 5.

The embodiments of the invention in which an exclusive property or privilege is claimed are defined as follows:

1. In a disc brake shoe assembly having a backing plate, a friction pad secured to one side of said backing plate and an insulator formed as a layer and secured to the other side of said backing plate, said insulator having a high pressure area of disc brake actuating member contact subject to high pressure loading during brake actuation, with a portion of said insulator positioned laterally from said high pressure area and subject to no direct pressure loading from the disc brake actuating member during brake actuation:

an arrangement preventing deformation of the insulator because of high pressure loading of said high pressure area by the disc brake actuating member during brake actuation and consequent buckling and detachment of at least a portion of said insulator from said backing plate which results in a decreased insulating function of said insulator, said arrangement comprising:

at least one slot formed through said insulator immediately adjacent but laterally away from said high pressure area, said at least one slot providing a discontinuity in the deformation of the insulator caused by high pressure loading and permitting said laterally away portion of said insulator to remain secured to the backing plate.

2. In a disc brake shoe assembly having a backing plate, a friction pad secured to one side of said backing plate and an insulator formed as a layer and secured to the other side of said backing plate, said insulator having a high pressure area of disc brake actuating piston contact subject to high pressure loading during brake actuation, with a portion of said insulator positioned laterally from said high pressure area and subject to no direct pressure loading from the disc brake actuating piston during brake actuation:

an arrangement preventing deformation of the insulator because of high pressure loading of said high pressure area by the disc brake actuating piston during brake actuation and consequent buckling and detachment of at least a portion of said insulator from said backing plate which results in a decreased insulating function of said insulator, said arrangement comprising:

at least one slot formed through said insulator immediately adjacent but laterally away from said high pressure area, said at least one slot providing a discontinuity in the deformation of the insulator caused by piston high pressure loading and permitting said laterally away portion of said insulator to remain secured to the backing plate.

3. In a disc brake shoe assembly having a backing plate, a friction pad secured to one side of said backing plate and an insulator formed as a layer and secured to the other side of said backing plate, said insulator having a high pressure area of disc brake caliper actuating member contact subject to high pressure loading during brake actuation, with a portion of said insulator positioned laterally from said high pressure area and subject to no direct pressure loading from the disc brake caliper actuating member during brake actuation:

an arrangement preventing deformation of the insulator because of high pressure loading of said high pressure area by the disc brake caliper actuating member during brake actuation and consequent buckling and detachment of at least a portion of said insulator from said backing plate which results in a decreased insulating function of said insulator, said arrangement comprising:

at least one slot formed through said insulator immediately adjacent but laterally away from said high pressure area, said at least one slot providing a discontinuity in the deformation of the insulator caused by high pressure loading and permitting said laterally away portion of said insulator to remain secured to the backing plate.

4. In a disc brake shoe assembly having a backing plate, a friction pad secured to one side of said backing plate and an insulator formed as a layer and secured to the other side of said backing plate, said insulator having a high pressure area of disc brake actuating piston contact subject to high pressure loading during brake actuation, with a portion of said insulator positioned laterally outwardly from said high pressure area and subject to no direct pressure loading from the piston during brake actuation:

an arrangement preventing deformation of the insulator because of high pressure loading of said high pressure area by the piston during brake actuation and consequent buckling and detachment of at least a portion of said insulator from said backing plate which results in a decreased insulating function of said insulator, said arrangement comprising:

at least one slot formed through said insulator immediately adjacent but laterally outward from said high pressure area, said at least one slot providing a discontinuity in the deformation of the insulator caused by piston high pressure loading and permitting said laterally outward portion of said insulator to remain secured to the backing plate.

5. An insulator sheet for use in a disc brake shoe assembly by attachment to one side of a disc brake shoe assembly backing plate and adapted to be subject to high pressure area loading during brake actuation by a disc brake actuating member acting on a limited surface area of the insulator sheet conforming to the area of the disc brake actuating member which is in brake actuating force transmitting contact with the insulator sheet during brake actuation, said insulator sheet having another area not engageable by the disc brake actuating member and therefore not subjectable to high pressure area loading, said another area adjoining said limited surface area and being laterally displaced therefrom, and slot means formed through said insulator sheet in said another area adjacent said limited surface area and establishing insulator sheet deformation discontinuity, said slot means being adapted to prevent deformation of said insulator sheet another area by high pressure area loading through the disc brake actuating member and thereby prevent detachment of said insulator sheet another area from the backing plate.

6. The subject matter of claim 5 in which the high pressure area loading to which the insulator sheet may be subjected is through a disc brake caliper leg acting on an outboard disc brake shoe assembly.

7. The subject matter of claim 5 in which the high pressure area loading to which the insulator sheet may be subjected is through a disc brake actuating piston acting on a disc brake shoe assembly.

8. In a disc brake assembly comprising a brake actuating piston having an annular end, a brake shoe assembly having one side engaged by said piston annular end in brake force transmittable relation and the other side engageable with a disc to be braked, said brake shoe assembly comprising a brake shoe, a friction pad secured to one side thereof for friction braking engagement with the disc, and an insulator sheet secured to the other side of said brake shoe and substantially covering said other brake shoe side, said piston annular end engaging said insulator sheet throughout a high pressure area conforming to said piston annular end where said piston annular end engages said insulator sheet so that said high pressure area includes at least one circumferentially extending arcuate section with a first portion of said insulator sheet radially within said at least one circumferentially extending arcuate section and at least a second portion of said insulator sheet radially outward of said at least one circumferentially extending arcuate section, and slot means in said at least a second portion of said insulator sheet extending through said insulator sheet from the side thereof engaged by said piston annular end to the side thereof secured to said brake shoe, said slot means being adjacent said at least one circumferentially extending arcuate section of said high pressure area and providing a deformation discontinuity between said high pressure area and substantially all of said at least a second portion of said insulator sheet laterally outward from said high pressure area.

9. The subject matter of claim 8 wherein said slot means is arcuate.

10. The subject matter of claim 8 wherein said slot means is closed at the ends thereof.

11. The subject matter of claim 8 wherein said slot means is a plurality of slot sections at least one of which is closed at the ends thereof.

12. The subject matter of claim 8 wherein said slot means is formed by one or more straight line slots.

13. The subject matter of claim 8 wherein said high pressure area is composed of two arcuate sections and said second portion of said insulator sheet is composed of two oppositely positioned sections of insulator sheet, and said slot means is composed of one or more slots in each of said two oppositely positioned sections of insulator sheet.

14. The subject matter of claim 8 wherein said insulator is a noise insulator made of multiple layers including a first layer of steel glued to a second layer of steel by a visco-elastic adhesive.

* * * * *